United States Patent
Chan et al.

(10) Patent No.: US 10,411,586 B2
(45) Date of Patent: Sep. 10, 2019

(54) CIRCUIT AND METHOD FOR OVERCURRENT CONTROL AND POWER SUPPLY SYSTEM INCLUDING THE SAME

(71) Applicant: Joulwatt Technology (Hangzhou) Co., Ltd., Hangzhou (CN)

(72) Inventors: Siopang Chan, Hangzhou (CN); Pitleong Wong, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 24 days.

(21) Appl. No.: 15/669,247

(22) Filed: Aug. 4, 2017

(65) Prior Publication Data

US 2018/0041111 A1 Feb. 8, 2018

(30) Foreign Application Priority Data

Aug. 6, 2016 (CN) .......................... 2016 1 0638190

(51) Int. Cl.
| | |
|---|---|
| *H02M 1/32* | (2007.01) |
| *H02H 9/02* | (2006.01) |
| *H02H 3/087* | (2006.01) |
| *H02M 3/156* | (2006.01) |
| *H02M 1/00* | (2006.01) |

(52) U.S. Cl.
CPC .............. *H02M 1/32* (2013.01); *H02H 3/087* (2013.01); *H02H 9/02* (2013.01); *H02M 3/156* (2013.01); *H02M 2001/0025* (2013.01); *H02M 2003/1566* (2013.01)

(58) Field of Classification Search
CPC ........... H02M 1/32; H02M 2001/0025; H02M 2003/1566; H02M 3/156; H02H 9/02
See application file for complete search history.

(56) References Cited

U.S. PATENT DOCUMENTS

| | | | | |
|---|---|---|---|---|
| 2005/0275394 A1* | 12/2005 | Moraveji | ................ | G05F 1/565 323/312 |
| 2009/0278521 A1* | 11/2009 | Omi | ........................ | H02M 1/36 323/288 |
| 2011/0169470 A1* | 7/2011 | Itakura | .................... | H02M 1/32 323/282 |
| 2013/0120891 A1* | 5/2013 | Truong | ................... | H02M 1/32 361/93.9 |

(Continued)

FOREIGN PATENT DOCUMENTS

CN 105704866 A 6/2016

*Primary Examiner* — Gary L Laxton
*Assistant Examiner* — Demetries A Gibson
(74) *Attorney, Agent, or Firm* — Treasure IP Group, LLC

(57) ABSTRACT

The present disclosure relates to a circuit and a method for overcurrent control and a power supply system including the same. When the system operates normally, a reference voltage has a constant value. When a short circuit or an overcurrent occurs at an output of the system, the reference voltage will be pulled down,. When the system is recovered from the short circuit or the overcurrent state, the reference voltage increases slowly up to a steady value. A feedback signal of an output voltage follows the reference voltage and increases slowly. Thus, an overshoot of the output voltage can be effectively eliminated to avoid damages to the system.

10 Claims, 5 Drawing Sheets

(56) References Cited

U.S. PATENT DOCUMENTS

| | | | |
|---|---|---|---|
| 2015/0028823 A1* | 1/2015 | Li | G05F 1/66 |
| | | | 323/234 |
| 2015/0222180 A1* | 8/2015 | Deguchi | H02M 3/156 |
| | | | 323/282 |
| 2016/0026199 A1* | 1/2016 | El-Nozahi | G05F 1/575 |
| | | | 323/274 |
| 2016/0241134 A1* | 8/2016 | Maruyama | H02M 1/4225 |
| 2016/0360582 A1* | 12/2016 | Kato | H05B 33/0815 |
| 2017/0019030 A1* | 1/2017 | Sugawara | H02M 1/4225 |
| 2017/0222550 A1* | 8/2017 | Chan | G05F 1/561 |

* cited by examiner

CIRCUIT AND METHOD FOR OVERCURRENT CONTROL AND POWER SUPPLY SYSTEM INCLUDING THE SAME

PRIORITY

This application claims the benefit of Chinese Patent Application No. 201610638190.9, filed on Aug. 6, 2016, which is incorporated herein by reference in its entirety.

BACKGROUND OF THE DISCLOSURE

Field of the Disclosure

The present disclosure relates to the technical field of power electronic technology, and in particularly, to a circuit and a method for overcurrent control and a power supply system including the same.

Background of the Disclosure

A power supply is used for supplying electric energy in an electronic product, which is required to meet the performance requirements of the electronic product and to protect itself from damages such as overvoltage, overcurrent and overheating. Once an electronic product fails, it will be damaged or even cause a fire or other bad consequences. Therefore, the protective function of the power supply have to be perfect, where an overcurrent protection is a common protective function.

In the prior art, as shown in FIG. 1, in a power supply system, when a short circuit of a load 107 or an overcurrent occurs at an output, the system generates a short-circuit signal SHORT by use of a shorted-output detecting circuit 106. Under the short circuit or the overcurrent, in one case, the system provides a maximum current at the output, or in another case, it provides the maximum current at the output just for a while, and then stops the output for a time period, and then provides the maximum current at the output again for some time, and then stops the output again for another time period. At this time, the voltage VFB of feedback output terminal is smaller than its reference voltage VREF, so the operational amplifier 103 remains outputting a highest value. When the maximum current is being provided at the output, the short circuit of the load 107 or the overcurrent will be recovered, the output voltage of the operational amplifier 103 will output a high-level voltage which will make an output voltage of the system rapidly increase, and when the increasing of the output voltage Vout makes the feedback signal VFB of the output voltage equal to the reference voltage VREF, the operational amplifier 103 outputs a much higher voltage than the voltage output by the operational amplifier under a steady state.

Generally, there is a capacitive element or a capacitive parameter in a regulating system, so the operational amplifier 103 needs a period of time to adjust its output voltage to a steady value. The adjusting process will cause an overshoot on the output voltage, shown in FIG. 2. The overshoot situation will cause huge damages to both of the load and the circuit of the power source.

SUMMARY OF THE DISCLOSURE

In view of this, the present disclosure provides a circuit and a method for overcurrent control and a power supply system including the same, in order to solve the overshoot problem on the output voltage when a short circuit or an overcurrent is recovered at the output of the system in traditional solutions.

According to a first aspect, there is provided a circuit for overcurrent control, which is used in a power supply system, comprising:

an auxiliary reference voltage generating circuit, configured to generate an auxiliary reference voltage;

a low-voltage follower circuit, configured to receive a first threshold value and the auxiliary reference voltage and to provide a lower one of the first threshold value and the auxiliary reference voltage as a reference voltage, the first threshold value representing a rated value of an output voltage;

wherein, when a short circuit or an overcurrent occurs at an output of the power supply system, the auxiliary reference voltage is lower than the first threshold value;

an error amplifier, configured to generate an amplified error signal in accordance with the reference voltage and a feedback signal of the output voltage.

Preferably, the auxiliary reference voltage generating circuit comprises:

a voltage generating circuit, configured to generate an intermediate voltage;

a pull-down clamping circuit, which clamps the intermediate voltage at a predetermined value as said auxiliary reference voltage, when the intermediate voltage is larger than the predetermined value, and which has no influence on the intermediate voltage as said auxiliary reference voltage, when the intermediate voltage is lower than the predetermined value.

Preferably, the predetermined value is a sum of a second threshold value and the feedback signal of the output voltage, wherein the feedback signal of the output voltage represents a value of the output voltage, the second threshold value is lower than the first threshold value.

Preferably, the pull-down clamping circuit is enabled when the short circuit or the overcurrent occurs at the output of the system.

Preferably, the pull-down clamping circuit is enabled before the short circuit or the overcurrent occurs at the output of the system is recovered.

Preferably, an output of the error amplifier is saturated when the short circuit or the overcurrent occurs at the output of the system.

According to a second aspect, there is provided a power supply system, comprising:

a power stage circuit, and the circuit for overcurrent control according to the first aspect above.

According to a third aspect, there is provided a method for overcurrent control, which is used in a power supply system, comprising:

generating an amplified error signal according to a reference voltage and a feedback signal of an output voltage, setting the reference voltage as a first threshold value when the power supply system operates normally, wherein the first threshold value represents a rated value of the output voltage;

clamping the reference voltage at a sum of a second threshold value and the feedback signal of the output voltage when a short circuit or an overcurrent occurs at the output of the system, wherein the second threshold value is smaller than the first threshold value;

generating a control signal for a switch in the power supply system in accordance with the amplified error signal.

Preferably, when the output of the power supply system is recovered from the short circuit or the overcurrent, the reference voltage increases from a sum of the second threshold value and the feedback signal of the output voltage up to the first threshold value.

Preferably, an output of the error amplifier is saturated when the short circuit or the overcurrent occurs at the output of the system.

According to the embodiments of the present disclosure, when the system operates normally, the reference voltage with a constant value is used; when a short circuit or a overcurrent occurs at the output of the system, the reference voltage will be pulled down, so that when the system is recovered from the short circuit or the overcurrent, the reference voltage increases slowly up to a steady value and the feedback signal of the output voltage also increases slowly following the reference voltage, therefore the overshoot of the output voltage can be effectively eliminated which avoid damages to the system.

BRIEF DESCRIPTION OF THE DRAWINGS

Those technical solutions according to embodiments of the present disclosure and the prior art will be apparent when they are described in connection with appended drawings which are firstly described briefly herein below. It will be obvious to one skilled in the art that the following appended drawings show only some embodiments of the present disclosure. Other appended drawings can be obtained from these appended drawings without the need for creative work.

DETAILED DESCRIPTION OF THE DISCLOSURE

Figure 1:
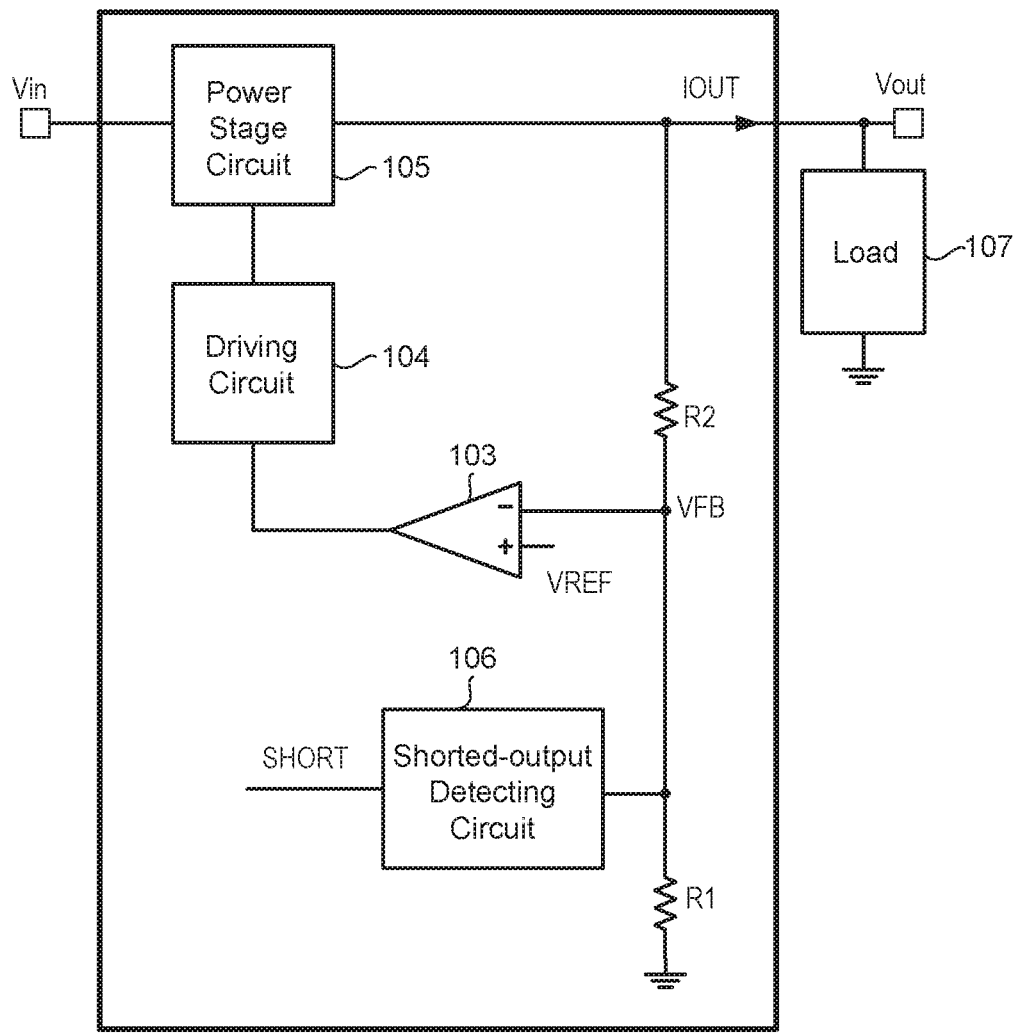
FIG. 1 is a block diagram of a switching power source according to the prior art.
Figure 2:
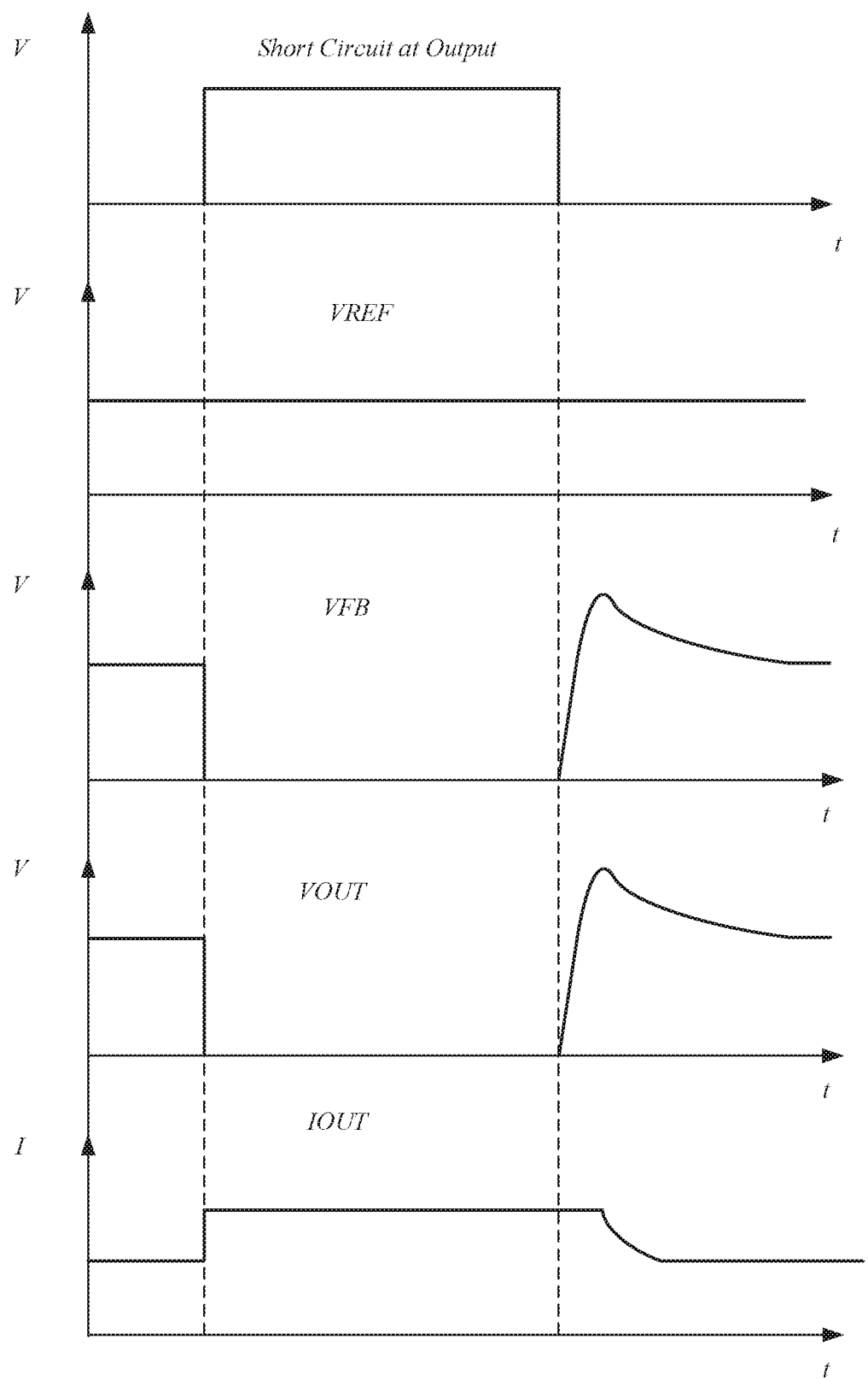
FIG. 2 is an operating waveform of a power supply system according to the prior art.

Reference will now be made in detail to particular embodiments of the disclosure, it will be understood that the scope of the present disclosure is not limited to these embodiments. Furthermore, in the following detailed description of the present disclosure, numerous specific details are set fourth in order to provide a thorough understanding of the present disclosure. However, it will be readily apparent to one skilled in the art that the present disclosure may be practiced without these specific details. In other instances, well-known methods, procedures, processes, components, and circuits have not been described in detail so as not to unnecessarily obscure aspects of the present disclosure.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Referring to the analysis of the prior art mentioned in the background of the disclosure, in the circuit for overcurrent control in the prior art, the value of the reference voltage VREF is fixed all the time, which will cause the overshoot on the output voltage when the output of the system is recovered from the short circuit or the overcurrent. Based on above, the circuit for overcurrent control according to the disclosure will pull the reference voltage VREF down when the short circuit or the overcurrent occurs at the load (the short circuit is a special case of the overcurrent), so that when the short circuit or the overcurrent at the load is recovered, the reference voltage VREF increases slowly up to a steady value, the feedback signal VFB of the output voltage also increases slowly following the reference voltage VREF, therefore the overshoot of the output voltage can be effectively eliminated.

Figure 3:
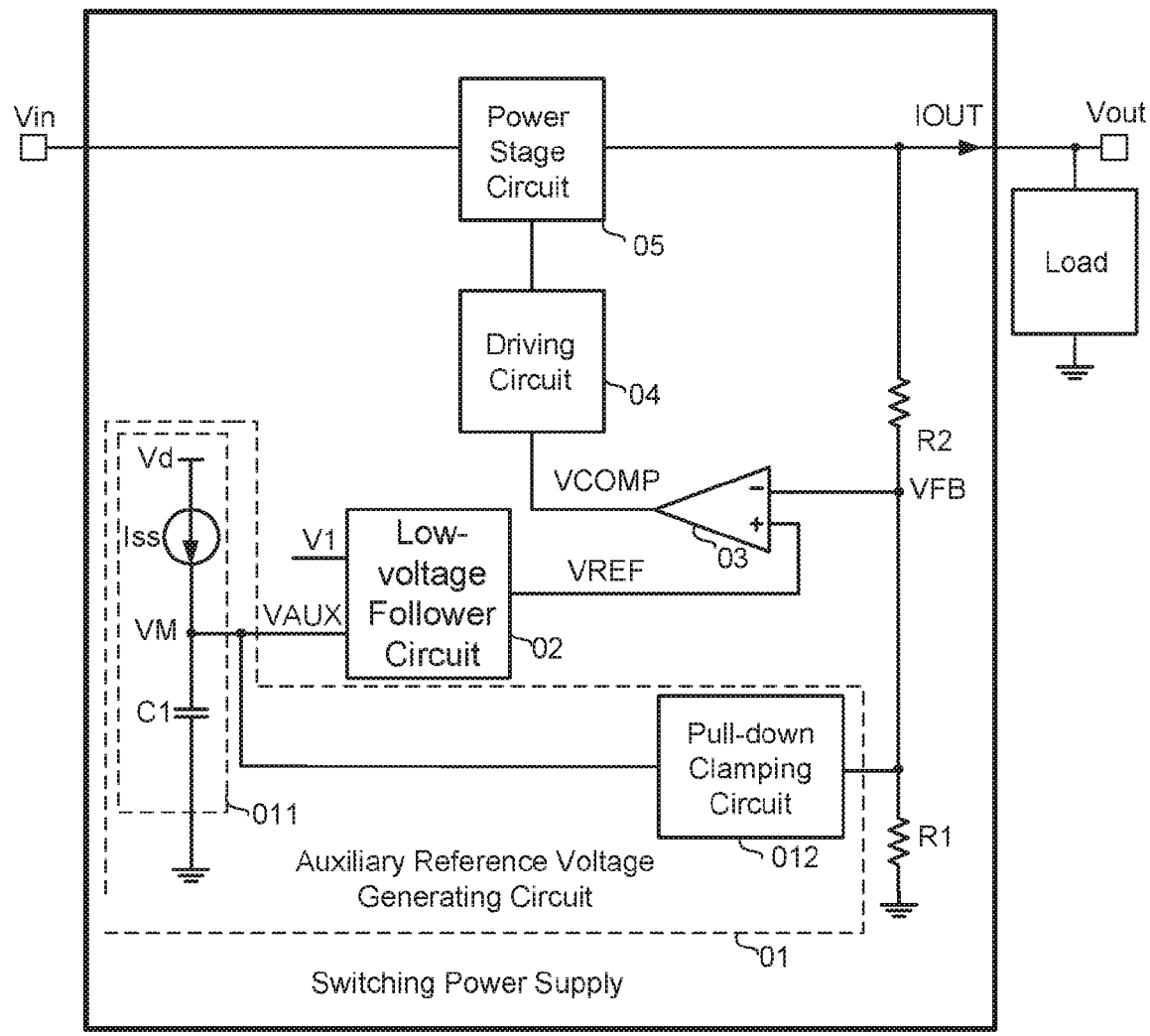
FIG. 3 is a block diagram of a circuit for overcurrent control according to the present disclosure.

FIG. 3 is a block diagram of a circuit for overcurrent control according to the present disclosure. As referring to FIG. 3, the circuit for overcurrent control, which is used in a power supply system, comprises an auxiliary reference voltage generating circuit 01, a low-voltage follower circuit 02 and an error amplifier 03.

The auxiliary reference voltage generating circuit 01 is used to generate an auxiliary reference voltage VAUX. In some embodiments, the auxiliary reference voltage generating circuit may comprise a voltage generating circuit 011 and a pull-down clamping circuit 012.

Wherein, the voltage generating circuit 011 is used to generate the intermediate voltage VM, the intermediate voltage VM is a linear voltage or a nonlinear voltage. In the embodiment shown in FIG. 3, a linear voltage generating circuit is taken as an example of the voltage generating circuit 011, which comprises a current source ISS and a first capacitor C1, one terminal of the first capacitor C1 is connected with the current source ISS, and the other terminal of the first capacitor C1 is connected to ground. The voltage generating circuit 011 outputs the intermediate voltage VM at the common terminal of the first capacitor C1 connected with the current source ISS.

When the intermediate voltage VM is larger than a predetermined value, the pull-down clamping circuit 012 is used to clamp the intermediate voltage VM at the predetermined value, under this situation, the predetermined value is regarded as the auxiliary reference voltage VAUX; when the intermediate voltage VM is lower than the predetermined value, the pull-down clamping circuit 012 has no influence on the intermediate voltage VM, under this situation, the intermediate voltage VM is regarded as the auxiliary reference voltage VAUX. The pull-down clamping circuit 012 is enabled before the short circuit or the overcurrent occurring at the output of the system is recovered, preferably, the pull-down clamping circuit 012 may start to be enabled when the short circuit or the overcurrent occurs at the output of the system.

It should be noted that, the predetermined value mentioned here does not refer to a fixed threshold value, instead, it is set to be the sum of the second threshold value V2 and the feedback signal VFB of the output voltage, wherein the feedback signal VFB of the output voltage is used to represents the value of the output voltage VOUT. The output voltage VOUT will vary with the changing of the load, so the feedback signal VFB of the output voltage varies accordingly, as a result, the predetermined value is not a fixed threshold value either.

The low-voltage follower circuit 02 is used to receive a first threshold value V1 and the auxiliary reference voltage VAUX, and also used a lower one of the first threshold value V1 and the auxiliary reference voltage VAUX as the reference voltage VREF, the first threshold value V1 is used to represent a rated value of the output voltage. Wherein, when a short circuit or an overcurrent occurs at the output of the system, the auxiliary reference voltage VAUX is lower than the first threshold value.

The error amplifier 03 is used to generate the amplified error signal VCOMP in accordance with the reference voltage VREF and the feedback signal VFB of the output voltage.

It can be understood that, the circuit for overcurrent control may further include a driving circuit 04. According to the amplified error signal VCOMP, the driving circuit 04 generates a control signal of the power switch in the power supply system in order to control an on time and an off time of the power switch, making the output voltage meet operating requirements.

In the disclosure, the judgement on whether the short circuit or the overcurrent occurs can be made by detecting the saturated situation of the error amplifier 03. When the short circuit or the overcurrent occurs at the output of the system, the output of the error amplifier 03 will be saturated and the amplified error signal VCOMP provided by the error amplifier 03 will reach its maximum value or minimum value. Therefore, there's no need to introduce an additional comparator for judging the operating state of the system, also, a state with the short circuit and a state with the overcurrent can be seamlessly interconverted with a normal operating state.

According to the circuit for overcurrent control in the present disclosure, in order to inhibit the generation of the overshoot of the output voltage VOUT when the short circuit or the overcurrent is recovered, the feedback signal VFB of the output voltage is highly reduced when the short circuit or the overcurrent at the load occurs, at this time, the reference voltage VREF will also be pulled down to reduce the voltage difference between the reference voltage and the feedback signal VFB of the output voltage, therefore the reference voltage VREF can increase slowly up to a steady value when the short circuit or the overcurrent at the load is recovered. The increasing rate of the reference voltage VREF is slow enough, which leads to a result that the feedback signal VFB of the output voltage can change with the reference voltage VREF, thereby the overshoot of the output voltage can be eliminated.

Combining with the operating waveform of the power supply system, the operating principle and the operating process of the circuit for overcurrent control according to the present disclosure is described below in detail.

As shown in FIG. 3, an input terminal of the pull-down clamping circuit 012 receives the feedback signal VFB of the output voltage, an output terminal of the pull-down clamping circuit 012 is connected to a common node between the first capacitor C1 and the current source ISS in the voltage generating circuit 011. When the intermediate voltage VM is larger than the sum of the second threshold value V2 and the feedback signal VFB of the output voltage, the pull-down clamping circuit 012 will pull the intermediate voltage VM down to the sum of the feedback signal VFB of the output voltage and the second threshold value V2. When the intermediate voltage VM is not larger than the sum of the second threshold value V2 and the feedback signal VFB of the output voltage, the pull-down clamping circuit 012 will have no influence on the intermediate voltage VM and will generate the auxiliary reference voltage VAUX based on the intermediate voltage VM; the low-voltage follower circuit 02 receives the first threshold value V1 and the auxiliary reference voltage VAUX, and provides a lower one of the first threshold value V1 and the auxiliary reference voltage VAUX as the reference voltage VREF; the error amplifier 03 is used to generate the amplified error signal VOMP in accordance with the reference voltage VREF and the feedback signal VFB of the output voltage; the driving circuit 04 is used to generate the control signal of a power switch in the power supply system.

When the power supply system operates normally, the reference voltage VREF is equal to the first threshold value V1, the error amplifier circuit 03 generates the amplified error signal VCOMP in accordance with the first threshold value V1 and the feedback signal VFB of the output voltage, the driving circuit 04 generates the control signal of the power switch in the power supply system in accordance with the amplified error signal VCOMP to adjusting the output current of the power supply system, which makes the feedback signal VFB of the output voltage equal to the reference voltage VREF, i.e., the feedback signal VFB of the output voltage is equal to the first threshold value V1, wherein the first threshold value V1 is used to represent the rated value of the output voltage, thus the power supply system can be adjusted to operate under a normal state.

Figure 4:
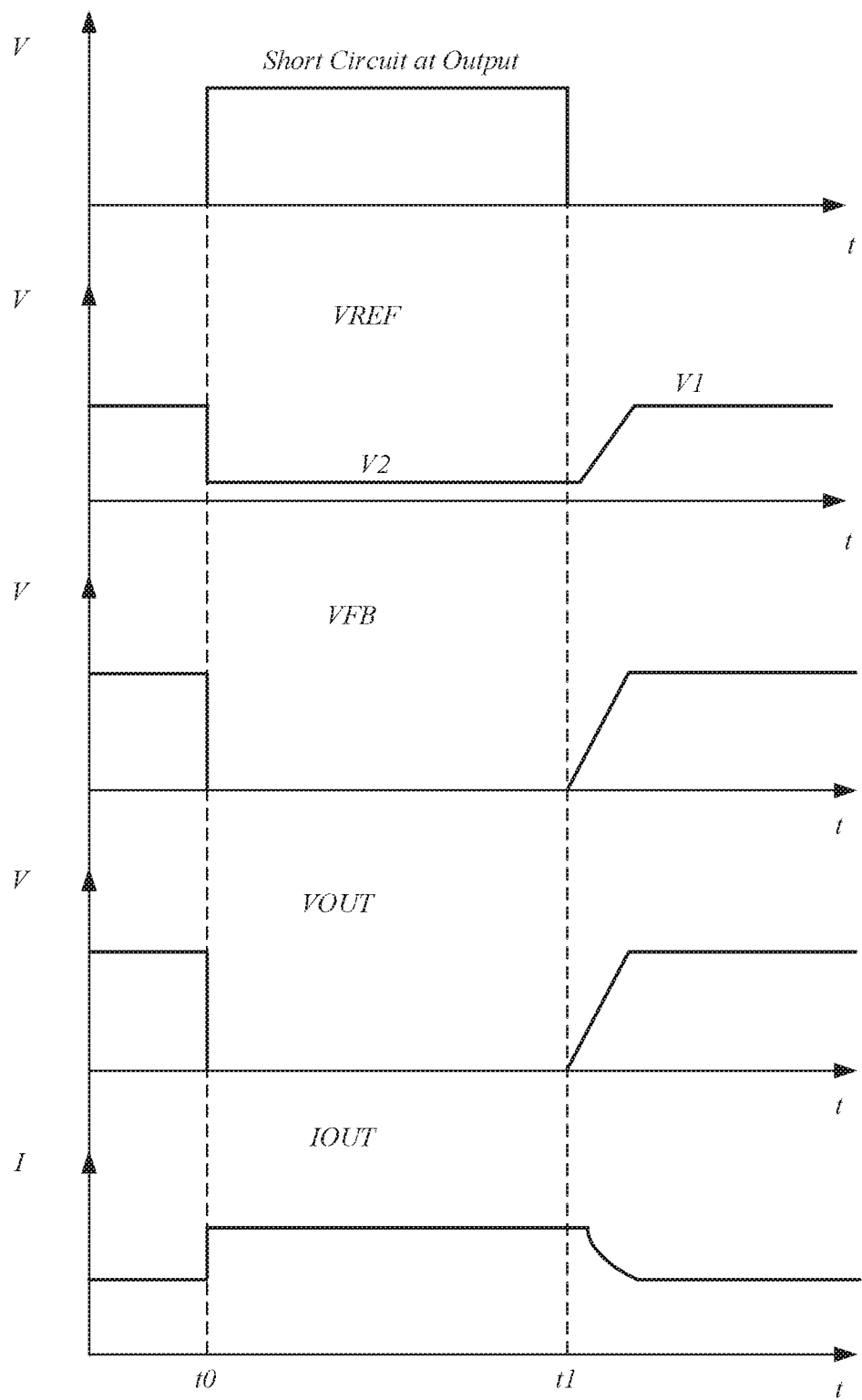
FIG. 4 is an operating waveform of a power supply system when a short circuit occurring at the output.

When the short circuit occurs at the output of the power supply system, as shown in FIG. 4, at time t0, the feedback signal VFB of the output voltage is reduced to 0, at this time, the intermediate voltage VM is larger than the sum of the second threshold value V2 and the feedback signal VFB of the output voltage, so that the auxiliary reference voltage VAUX will be pulled down to the sum of the second threshold value V2 and the feedback signal VFB of the output voltage, i.e., to the second threshold value V2. At time t1, when the short circuit is recovered, the feedback signal VFB of the output voltage increases, and at the same time, the auxiliary reference voltage VAUX increases accordingly. The increasing rate of the intermediate voltage VM can be adjusted by setting the current of the current source ISS and the capacitance of the first capacitor C1, which will make the increasing rate of the intermediate voltage VM lower than the increasing rate of the feedback signal VFB of the output voltage when the short circuit or the overcurrent is recovered. Because the increasing rate of the feedback signal VFB of the output voltage is larger than that of the intermediate voltage VM, when the feedback signal VFB of the output voltage increases up to a value which makes the intermediate voltage VM smaller than or equal to the sum of the second threshold value V2 and the feedback signal VFB of the output voltage, the pull-down clamping circuit 012 won't pull the intermediate voltage VM down, at this time, the auxiliary reference voltage VAUX is equal to the intermediate voltage VM, and the increasing rated of the auxiliary reference voltage VAUX is only controlled by the current source ISS and the first capacitor Cl. At this time, the reference voltage VREF changes with the intermediate voltage VM, the feedback signal VFB of the output voltage changes with the reference voltage VREF. When the auxiliary reference voltage VAUX increases up to V1, the reference voltage VREF will be fixed to the first threshold value V1 instead of changing with the auxiliary reference voltage VAUX. Because the increasing rate of the reference voltage VREF is relatively slow, the feedback signal VFB of the output voltage can follow up with the increasing rate of the reference voltage VREF, so that the overshoot of the output voltage VOUT will be eliminated.

Figure 5:
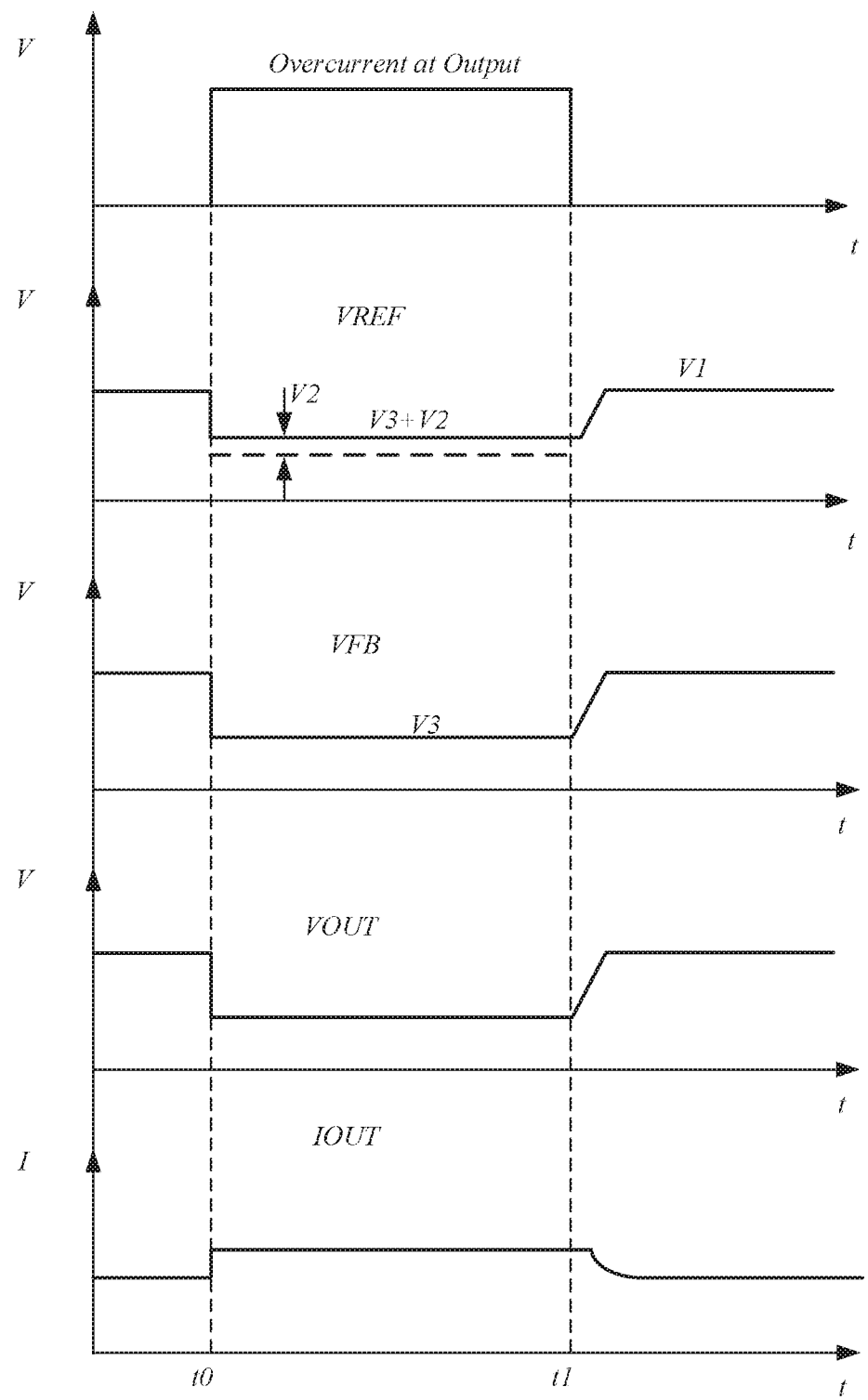
FIG. 5 is an operating waveform of a power supply system when an overcurrent occurs at the output.

When the overcurrent occurs at the output of the power supply system, as shown in FIG. 5, different with the short circuit, the output voltage VOUT and the feedback signal VFB of the output voltage will not be reduced to 0, but will decrease to a certain threshold value instead, for example, a third threshold value V3, other operating principles and processes are all the same with the principles and processes when the short circuit occurs at the output.

According to the circuit for overcurrent control in the present disclosure, when the system operates normally, the reference voltage with a constant value is used; when the short circuit or the overcurrent occurs at the output of the system, the reference voltage VREF will be pulled down, so that when the system is recovered from the short circuit or the overcurrent, the reference voltage VREF increases slowly up to a steady value and the feedback signal VFB of the output voltage also increases slowly following the reference voltage VREF, therefore the overshoot of the output voltage can be effectively eliminated which avoid damages to the system.

According to another aspect of the present disclosure, there is also provided a method for overcurrent control, comprising:

generating an amplified error signal according to a reference voltage and a feedback signal of an output voltage, when the power supply system operates normally, setting the reference voltage as a first threshold value, wherein the first threshold value represents a rated value of the output voltage;

when a short circuit or an overcurrent occurs at the output of the system, clamping the reference voltage at a sum of a second threshold value and the feedback signal of the output voltage, wherein the second threshold value is smaller than the first threshold value;

generating a control signal for a switch in the power supply system in accordance with the amplified error signal.

When the output of the power supply system is recovered from the short circuit or the overcurrent, the reference voltage increases from the sum of the second threshold value and the feedback signal of the output voltage up to the first threshold value.

When the output of the power supply system is recovered from the short circuit or the overcurrent, the increasing rate of the reference voltage is lower than the increasing rate of the feedback signal of the output voltage.

According to the method for overcurrent control in the disclosure, when the system operates normally, the reference voltage with a constant value is used; when the short circuit or the overcurrent occurs at the output of the system, the reference voltage will be pulled down, so that when the system is recovered from the short circuit or the overcurrent, the reference voltage VREF increases slowly up to a steady value, and the feedback signal VFB of the output voltage also increases slowly following the reference voltage, therefore the overshoot of the output voltage can be effectively eliminated which avoid damages to the system.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

The invention claimed is:

1. A circuit for overcurrent control, which is used in a power supply system, comprising:
   a first reference voltage generating circuit, configured to generate a first reference voltage;
   a low-voltage follower circuit, configured to receive a first threshold value and said first reference voltage and to provide a lower one of said first threshold value and said first reference voltage as a second reference voltage, said first threshold value representing a rated value of an output voltage,
   wherein, when a short circuit or an overcurrent occurs at an output of said power supply system, said first reference voltage is lower than said first threshold value;
   an error amplifier, configured to generate an amplified error signal in accordance with said second reference voltage and a feedback signal of said output voltage,
   wherein said first reference voltage generating circuit comprises:
   a voltage generating circuit, configured to generate an intermediate voltage;
   a pull-down clamping circuit, which clamps said intermediate voltage at a predetermined value as said first reference voltage, when said intermediate voltage is larger than said predetermined value, and which has no influence on said intermediate voltage as said first reference voltage, when said intermediate voltage is lower than said predetermined value.

2. The circuit for overcurrent control according to claim 1, wherein said predetermined value is a sum of a second threshold value and said feedback signal of said output voltage, wherein said feedback signal of said output voltage represents a value of said output voltage, said second threshold value is smaller than said first threshold value.

3. The circuit for overcurrent control according to claim 1, wherein said pull-down clamping circuit is enabled when said short circuit or said overcurrent occurs at said output of said system.

4. The circuit for overcurrent control according to claim 1, wherein said pull-down clamping circuit is enabled before said short circuit or said overcurrent occurs at said output of said system is recovered.

5. The circuit for overcurrent control circuit according to claim 1, wherein said output of said error amplifier is saturated when said short circuit or said overcurrent occurs at said output of said system.

6. The circuit for overcurrent control according to claim 1, further comprising:
   a power stage circuit.

7. A method for overcurrent control, which is used in a power supply system, comprising:
   generating an intermediate voltage;
   setting a first reference voltage as a predetermined voltage when said intermediate voltage is larger than said predetermined voltage, or setting said first reference voltage as said intermediate voltage when said intermediate voltage is lower than said predetermined voltage;

setting a lower one of said first reference voltage and a first threshold value as a second reference voltage;

generating an amplified error signal according to said second reference voltage and a feedback signal of an output voltage, setting said second reference voltage as said first threshold value when said power supply system operates normally, wherein said first threshold value represents a rated value of said output voltage;

clamping said second reference voltage at said predetermined value which is a sum of a second threshold value and said feedback signal of said output voltage when a short circuit or an overcurrent occurs at said output of said power supply system, wherein said second threshold value is smaller than said first threshold value;

generating a control signal for a switch in said power supply system in accordance with said amplified error signal.

8. The method for overcurrent control according to claim 7, wherein, when said output of said system is recovered from said short circuit or said overcurrent, said second reference voltage increases from said sum of said second threshold value and said feedback signal of said output voltage up to said first threshold value.

9. The method for overcurrent control according to claim 8, wherein said output of said error amplifier is saturated when said short circuit or said overcurrent occurs at said output of said system.

10. The circuit for overcurrent control according to claim 1, wherein said pull-down clamping circuit is configured to receive said feedback signal of said output voltage, and said predetermined value varies with said output voltage.

* * * * *